United States Patent
Davis

[15] 3,690,403
[45] Sept. 12, 1972

[54] ACOUSTIC ENERGY SOURCE UTILIZING THE WATER-HAMMER PHENOMENON

[72] Inventor: Billy W. Davis, Houston, Tex.

[73] Assignee: Texas Instruments Incorporated, Dallas, Tex.

[22] Filed: Jan. 2, 1970

[21] Appl. No.: 147

[52] U.S. Cl. ............... 181/.5 H, 181/.5 A, 340/8, 340/14, 340/17
[51] Int. Cl. .................................. G01v 1/14
[58] Field of Search ........... 181/.5 A, .5 H; 340/8, 14, 340/17

[56] References Cited

UNITED STATES PATENTS

| | | | |
|---|---|---|---|
| 3,277,437 | 10/1966 | Bouyoucos | 181/.5 H |
| 2,587,848 | 3/1952 | Horslay et al. | 181/.5 H |
| 3,433,202 | 3/1969 | Sharp et al. | 340/8 |
| 3,123,043 | 3/1964 | Bodine, Jr. | 181/.5 A |
| 3,249,177 | 5/1966 | Chalminski | 181/.5 H |
| 3,376,949 | 4/1968 | Baker et al. | 181/.5 H |
| 3,536,157 | 10/1970 | Anstey | 181/.5 H |

Primary Examiner—Benjamin A. Borchelt
Assistant Examiner—N. Moskowitz
Attorney—James O. Dixon, Andrew M. Hassell, Harold Levine, Rene E. Grossman, Melvin Sharp and Richards, Harris & Hubbard

[57] ABSTRACT

An elongated pipe is connected at an upper end to a pressurized fluid container and extends downwardly into water at the lower end. A valve is connected between the pressurized fluid container and the elongated pipe. A piston member is slidable within the elongated pipe. A diaphragm is connected at the submerged end of the pipe and includes seating structure for engaging the piston member. When the valve is opened, a high energy supply of fluid is directed against the piston member to force the piston member at high speed down the pipe into abutment with the seating structure. Compressional waves are thus created along the length of the elongated pipe, the diaphragm coupling the compressional waves into the adjacent water to create acoustic energy for use in marine exploration.

26 Claims, 6 Drawing Figures

INVENTOR

BILLY W. DAVIS

INVENTOR

BILLY W. DAVIS 3,690,403

ACOUSTIC ENERGY SOURCE UTILIZING THE WATER-HAMMER PHENOMENON

This invention relates to sources of acoustic energy, and more particularly to sources of acoustic energy for use in seismic exploration which utilize the water-hammer principle.

It is common practice in marine seismic exploration to generate a series of acoustic waves at spaced points along a marine traverse. The reflections of the waves are then detected and recorded to provide seismic data with respect to the ocean floor and the underlying substrates. A number of different types of underwater seismic sources have heretofore been developed, including charges of explosives which are detonated behind a seismic exploration vessel. Other marine acoustic sources have utilized a mixture of gas which is detonated in an open-ended chamber underwater, as well as the rapid retraction of a hydraulic or vacuum actuated ram or piston in an open-ended cylinder to leave an implosion cavity. Additional acoustic sounds comprise servo controlled vibrating systems and air guns which suddenly release amounts of high pressure air underwater.

A basic problem with the use of the majority of heretofore developed underwater acoustic sources has been the inefficiency of conversion of available energy into acoustic energy. For instance, many prior acoustic sources have conversion efficiencies in the order of one percent, thereby requiring a large amount of energy which must be available in order to produce the minimum necessary amount of acoustic energy. Additionally, many previously developed acoustic sources have not provided a desirable energy distribution in the narrow low frequency bandwidth most useful for underwater seismic exploration purposes.

An improved acoustic energy conversion system is disclosed in U.S. Pat. No. 3,376,949, issued to Baker et al. on Apr. 9, 1968, wherein a kinetic fluid energy flow is converted to acoustic energy by abruptly closing a flow channel to terminate a high energy flow of water therethrough. This patent discloses the use of a remotely actuated valve operable to abruptly close the submerged end of an elongated pipe through which water is being passed. The source described in this patent has proved of substantial utility for seismic marine exploration, but has generally provided acoustic signals with a relatively wide frequency band. It is thus an object of the present invention to provide an acoustic source having an energy spectrum relatively sharply peaked with respect to frequency. It is also an object of the present invention to provide an acoustic source which can be turned to resonance in order to substantially increase the acoustic power output.

In accordance with the present invention, a flow channel has an end which includes seating structure. A piston is movable along the flow channel, and structure is provided to direct a high energy flow of fluid along the flow channel to cause the piston to abruptly close against the seating structure to thereby cause acoustic energy.

In accordance with a more specific aspect of the invention, a source of acoustic energy for marine seismic exploration includes a supply tank containing fluid under pressure. An elongated flow channel is connected to the supply tank and extends to an outlet location which is submerged underwater. Valve structure is operable to direct high energy fluid from the supply tank along the flow channel. A freely movable piston is disposed within the flow chamber for being moved by the high energy fluid directed along the flow channel. A diaphragm is disposed at the outlet location of the flow channel for abruptly stopping the piston to create acoustic energy which is transmitted to the water through the diaphragm.

In a more specific aspect of the invention, a pump located on a seismic exploration vessel picks up water during operation of the vessel. A pressurized container is connected to the pump for storing water under pressure. An elongated pipe is connected at one end to the pressurized container and extends downwardly from the vessel into the water. A valve is connected between the pressurized container and the elongated pipe. A piston member is slidable within the elongated pipe. An expandable diaphragm is connected at the submerged end of the pipe and includes seating structure for engaging the piston member. When the valve is operated, a high energy supply of water is directed against the piston member when the piston member is at the upper end of the pipe. The piston member is then forced at a high speed down the elongated pipe into abutment with the seating structure. Compressional waves thus created within the pipe are transmitted into the water as acoustic energy by the diaphragm.

For a more complete understanding of the present invention and for further objects and advantages thereof, reference is now made to the following description taken in conjunction with the accompanying drawings, in which.

Figure 5:
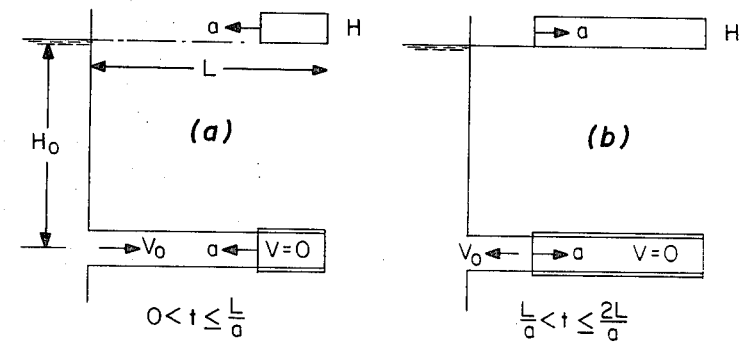
Figure 6:
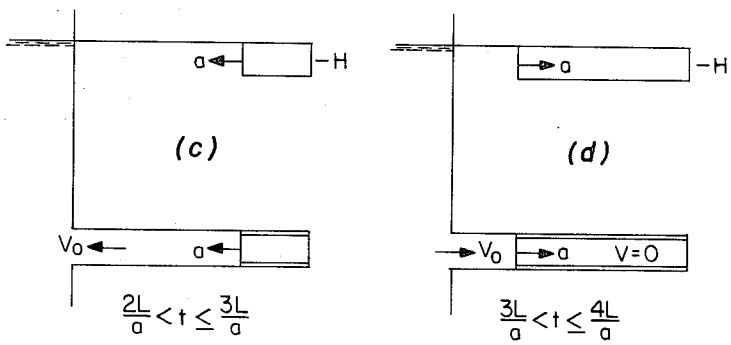
Figure 6:
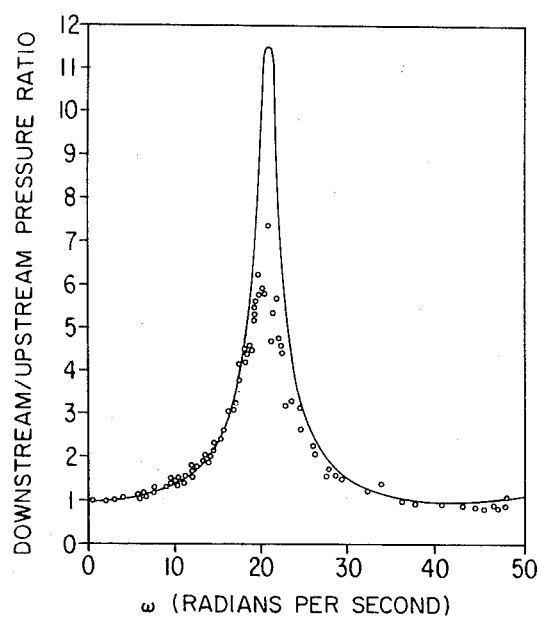

FIG. 5a–d are diagrammatic representations of the waterhammer reflection phenomenon; and FIG. 6 is a graph illustrating the pressure variance within the present acoustic generator as a function of frequency.

Figure 1:
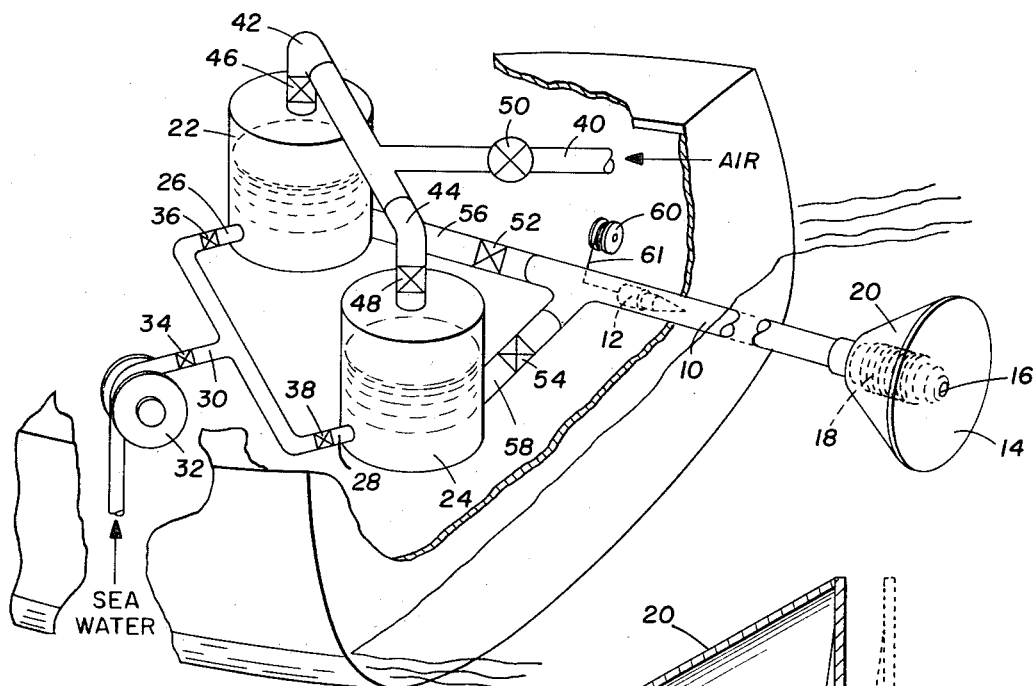
FIG. 1 is a somewhat diagrammatic perspective view of the preferred embodiment of the invention.

Referring to FIG. 1, the preferred embodiment of the invention is illustrated. An elongated, rigid pipe 10 forms a flow channel along which a piston member 12 is freely slidable. The lower end of the pipe 10 is adapted to be submerged underwater and includes a diaphragm 14 attached thereto. Seating structure 16 is provided in the diaphragm 14 to form a circular opening which communicates with the open end of the pipe 10. An expansion joint 18 is connected between the diaphragm 14 and the pipe 10 to allow relative movement therebetween during operation of the acoustic source. A conical wall 20 is connected to the rear of the diaphragm 14 for encompassing a pocket of air in order to "unload" the impedance of the rear side of the diaphragm for optimum results.

A pair of tanks 22 and 24 have inlets connected to supply pipes 26 and 28, respectively. Pipes 26 and 28 are connected at a T-joint to a main supply pipe 30. A conventional fluid pump 32 picks up seawater and supplies it through pipe 30 and pipes 26 and 28 to the tanks 22 and 24. It will be understood that the system shown in FIG. 1 is a suitable for mounting upon a seismic marine exploration vessel. The pump 32 will generally be located onboard the vessel and operated to suck up seawater adjacent the vessel and store the water within the tanks 22 and 24. The pipe 10 will normally extend downwardly from the side or underside of the vessel such that the diaphragm 14 is submerged underwater.

A check valve 34 is disposed in the pipe 30 to prevent passage of water back through the pump 32. Valves 36 and 38 are respectively disposed in the inlet pipes 26 and 28. Valves 36 and 38 may comprise any suitable two-way fluid valves, but preferably are electrically operable between open and closed positions. Thus, when valve 36 is open, seawater is supplied through pipes 30 and 26 to fill the tank 22. Additionally, when the valve 38 is opened, seawater is supplied from the pump 32 via pipes 30 and 28 into the tank 24.

A supply of pressurized air is provided through an inlet pipe 40 to pipes 42 and 44 through a T-connection. Pipe 42 opens into the upper part of the tank 22, while pipe 44 opens into the top of the tank 24. A valve 46 is located in pipe 42, while a valve 48 is located in pipe 44. Preferably, valves 46 and 48 are three-way electrically operated valves such that the air pressure provided within tanks 22 and 24 may be precisely controlled. A regulator unit 50 is disposed in the inlet pipe 40 to further aid in the control of the pressurized air fed into the tanks 22 and 24. Valves 52 and 54 are located in outlet pipes 56 and 48, respectively, the outlet pipes extending from the pressurized tanks 22 and 24. Pipes 56 and 58 join at a T-section to the open end of the pipe 10. A reel 60 includes a wire or cable 61 attached to the piston member 12 for returning the piston member to the initial position shown in FIG. 1 after operation of the device.

In basic operation of the device shown in FIG. 1, suitable amounts of seawater are deposited in the tanks 22 and 24 and pressurized with air by suitable operations of the valves 46 and 48 and the regulator 50. A selected one of the valves 52 or 54 is actuated and the pressurized air within the tank expands to drive the water from the tank at a high velocity. A high energy flow of seawater is thus directed against the rear of the piston member 12. The flow of water accelerates asymptotically to an equilibrium velocity and carries the piston member 12 at a high velocity down the pipe 10.

The piston member 12 then suddenly engages the seat structure 16 at the end of the pipe 10, and effectively abruptly blocks the high energy flow of water down the pipe. A plane compressional wave is thus developed in the water behind piston member 12, with the wave being propagated back toward the upper end of the pipe 10. As will be described in detail later, this compressional wave tends to reverberate and creates acoustic energy which is transmitted to the surrounding water or other acoustic transmitting medium by the diaphragm 14. After this generation of the acoustic event, the piston member 12 is reeled back to the position shown in FIG. 1 and the other pressurized tank is operated to again cause an acoustic disturbance.

It will be understood that, while two pressurized tanks 22 and 24 have been illustrated in order to increase the cycle frequency of the system by alternate use of the tanks, that more or less high pressure vessels could be utilized in the system. Simple electromechanical valves can be utilized to automatically sequence the operation of the device according to a predetermined program. Other sources of high energy fluid can also be utilized to supply fluid flow down the pipe 10, if desired. However, the illustrated system has been found to require substantially less input power than a continuously running pumping system in order to provide a source of high energy fluid against the piston member.

Figure 2:
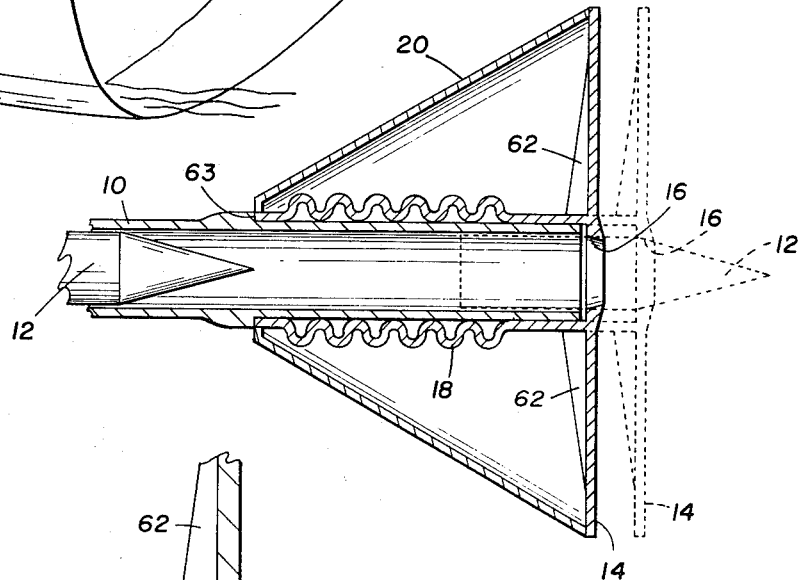
FIG. 2 is a sectional view of the submerged end of the system shown in FIG. 1.

FIG. 2 illustrates in more detail the construction of the lower end of the pipe 10. The expansion joint 18 may be seen to comprise a suitable metallic expandable joint, such as the expansion joints manufactured and sold by the Anaconda Corporation. The expansion joint 18 is connected at one end to the diaphragm 14. Diaphragm 14 comprises a circular metallic plate with a circular conical or tapered seat 16 defining a central opening therein. Structural bracing members 62 may be spaced about the diaphragm to rigidify the diaphragm. The conical wall 20 is connected to the outer periphery of the diaphragm 14 and tapers into abutment with the other end of the expansion joint 18. Preferably, this end of the expansion joint 18 abuts with a cylindrical shoulder 63 of the pipe 10. The edges of the conical wall 20 are slidable with respect to this end of the expansion joint 18. The wall 20 contains a pocket of air in order to provide a relatively low impedance to the rear of diaphragm 14, thus allowing the diaphragm to freely vibrate.

The piston member 12 is illustrated in FIG. 2 in solid lines as it approaches the diaphragm 14 during operation of the device. The dotted line representation shown in FIG. 2 illustrates the abutment of the piston member 12 with the tapered seat 16. The force of this abutment, and the occurrence of compressional waves in the pipe 10, forces the diaphragm 14 to vibrate outwardly away from the end of the pipe 10 as shown in dotted lines. The expansion joint 18 allows this outward movement of the diaphragm 14. It will be understood that when the piston member 12 impacts against the seat 16 the piston member 12 will not immediately be stopped, but will move along with the diaphragm 14 to the dotted line position. However, the seating of the piston member 12 upon the seat 16 will cause an abrupt discontinuity to exist in the pressure source of fluid energy behind the piston member 12 to cause the acoustic waves of the invention.

Figure 3:
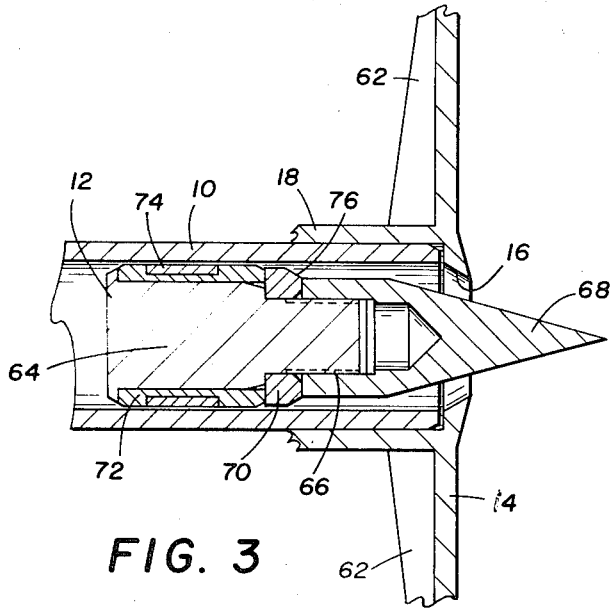
FIG. 3 is a sectional view of a portion of the structure shown in FIG. 2, along with a sectional view of the movable piston of the invention.

FIG. 3 shows in more detail the construction of the preferred embodiment of the piston member 12. The main body member 64 is preferably constructed form a suitable plastic such as Lexan or Plexiglas and includes a threaded portion 66. A nose cone 68 is also constructed form plastic and includes a counterbore portion which threadedly engages the threads 66. An impact disc 70 is made from resilient plastic or rubber and abuts with portions of the body member 64 and the nose cone 68 to provide shock absorbing functions. A sleeve 72 is mounted about the body 64 and preferably comprises a suitable plastic sleeve, such as Teflon, dimensioned to fit closely within the interior of the pipe 10. A ring 74 of magnetic rubber or the like may be disposed in the sleeve member 72. It will be noted that in the preferred embodiment the nose cone 68 is dimensioned to fit through the opening defined by the seat 16. The inclined surface 76 of the impact member 70 is dimensioned to closely seat with the seat 16 to close the opening of the diaphragm 14 and to terminate motion of the piston member 12.

In order to better understand the theory of operation of the present source, it may be shown that the magnitude of pressure behind the plane compressional wave generated when the piston member seats against the diaphragm may be represented by the equation:

$$p \cong \frac{a\rho V_o}{g}\left[1 + \frac{V_o}{a}\right] \quad (1)$$

wherein:
 $a$ = wave speed in the fluid
 $\rho$ = fluid density
 $V_0$ = velocity of fluid just prior to arrestment
 $g$ = gravitational constant.

Figure 4:
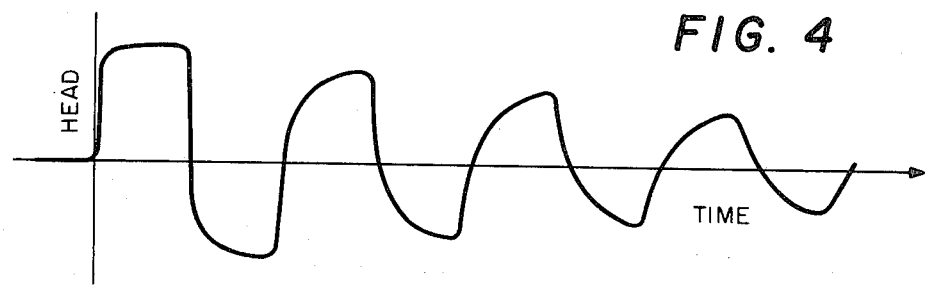
FIG. 4 is a representative waveform of the acoustic output provided by the invention.

The resulting plane compressional wave within the pipe 10 transforms the kinetic energy of the high energy flow of fluid into potential or pressure energy as identified by Equation (1). This compressional wave will reflect back and forth along the pipe 10 for several cycles. This reflection is termed the waterhammer phenomenon. FIG. 4 illustrates a typical, somewhat simplified, pressure versus time response at a point within the pipe 10 following the seating of the piston member against the diaphragm.

It may be shown that the fundamental frequency of the curve shown in FIG. 4 is:

$$f_n = a/4L_o \quad (2)$$

wherein
 $a$ = wave speed
 $L_0$ = pipe length.

Also it may be shown that the diaphragm 14 is cyclically displaced in accordance with the waves within the pipe at a fundamental frequency of $a/4L_0$. The resulting acoustic wave will last for a time determined by the physical characteristics of the particular device, but in a typical embodiment the waves shown in FIG. 4 would last for in the order of hundreds of milliseconds.

FIG. 5 illustrates several diagrammatic illustrations of the waterhammer phenomenon following a sudden valve closure along a high energy flow of fluid. In drawings 5a–d, L represents the distance along the pipe to the valve which is closed to terminate flow of fluid therein. $H_0$ represents the normal pressure head. In each one of the FIGS. 5a–d, the upper rectangle represents the pressure head of the fluid within the pipe, while the lower portion of the FIGURE is representative of the condition of the pipe wall. Referring to the FIGURES, at the instant of valve closure, or $t=0$, the fluid nearest the valve is compressed, brought to rest and the pipe wall is stretched. As soon as the first layer of fluid is compressed, the above process is repeated for the next layer. The fluid upstream from the closed valve continues to move downstream with undimimished speed until successive layers of the fluid have been compressed back to the source. The high pressure then moves upstream as a wave, bringing the fluid to rest as it passes, compressing the fluid, and expanding the pipe as shown in FIG. 5a.

When the pressure wave reaches the upstream end of the pipe at $T= L/a$, all of the fluid is under the extra head H, all the momentum has been lost, and all the kinetic energy has been converted into elastic energy. Referring a FIG. 5b, there is an unbalanced condition at the upstream or reservoir end at the instant of arrival of the pressure wave, since the reservoir pressure is unchanged. The fluid then starts to flow backwards as shown in FIG. 5b, beginning at the upstream end. This fluid flow returns the pressure to the value which was normal before closure of the valve, the pipewall returns to normal and the fluid moves at the velocity $V_0$ in the backwards sense. This process of conversion travels downstream toward the valve at the speed of sound a in the pipe. At the instant $2L/a$, the wave arrives at the valve, pressures are back to normal along the pipe, and velocity is everywhere $V_0$ in the backwards direction.

Since the valve is closed, no fluid is available to maintain the flow at the valve and a low pressure −H, as shown in FIG. 5c, is developed, such that fluid is brought to rest. This low pressure wave travels upstream at speed a and everywhere brings the fluid to rest, causes the fluid to expand because of the lower pressure and allows the pipewalls to contract. If the static pressure in the pipe is not sufficiently high to sustain the head −H above vapor pressure, the liquid vaporizes in part and continues to move backward over a longer period of time.

At the instant the negative pressure wave arrives at the upstream end of the pipe, or $3L/a$ seconds after closure, the fluid is at rest, but uniformly at head −H less than before closure of the valve. This leaves an unbalanced condition at the reservoir, and fluid flows into the pipe, acquiring a velocity $V_0$ forward and returning the pipe and fluid to a normal condition as the wave progresses downstream at speed a (shown in FIG. 5d). At the instant this wave reaches the valve, conditions are exactly as at the instant of closure for $L/a$ seconds earlier. The process is then repeated every $4L/a$ seconds. Of course, the action of fluid friction, and imperfect elasticity of the fluid and pipewall, damps out this vibration and eventually causes the fluid to come to rest as indicated in the curve shown in FIG. 4.

It has been found according to the invention that the resonance phenomenon can be taken advantage of to increase the acoustic power output of the present device by almost an order of magnitude. This may be done by adjusting the mass of the piston member 12 and the spring rate of the expansion joint 18 such that the damped spring-mass system has a natural frequency equal to the exciting frequency, or the cyclic pressure frequency within the pipe.

It may be shown that the natural frequency of the spring-mass system is:

$$f_n = \frac{1}{2\pi}\sqrt{\frac{k}{M} - \left(\frac{c}{2M}\right)^2} \quad (3)$$

$$= \frac{1}{2\pi}\sqrt{\frac{k}{M}}$$

wherein
 $k$ = spring rate $M$ = mass
$c$ = damping constant.

Thus, for water, a pipelength of about 25 feet would produce a resonant system at about 50 cycles per second. This resonance may be matched by a piston member mass of about 35 pounds and an expansion joint spring rate of about 9,000 pounds/inch.

The output spectra of the acoustic power from the invention may be easily shifted up and down the frequency scale by changing the pipelength. The output character of the source may also be adjustable by varying the sizes and masses of the piston members and of the diaphragms.

The present invention may thus be utilized to transform a maximum amount of energy to a fairly narrow frequency band. For instance, FIG. 6 illustrates the pressure ratio of the upper and lower ends of a practical embodiment of the pipe 10 with respect to frequency.

While the present invention has been described for use with a marine seismic exploration system wherein the acoustic transmission medium is water, it will be understood that the present acoustic source could also be used for land seismic operations by placing the diaphragm against the surface of the earth. The vibrations of the diaphragm would then be transferred directly to the earth's surface as seismic waves.

High energy outputs may be provided from the present device. For instance, if the flow velocity of the high pressure fluid reaches 150 feet per second just prior to the engagement of the piston member with the diaphragm, the pressure buildup in the pipe 10 will be about 10,000 p.s.i. If the pipe is provided with a diaphragm of only four inches in diameter, a cyclic force will be produced on the diaphragm having an amplitude of about 120,000 pounds. Higher energies are available with the use of larger diaphragms and higher fluid energy velocities.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A source of acoustic energy for marine seismic exploration comprising:
    a. pressurized supply tanks for providing fluid under pressure;
    b. an elongated flow channel having a pressurized fluid inlet end and an open outlet end, said inlet end being connected to said supply tanks for admitting fluid under pressure to said channel;
    c. A piston stop means; and
    d. piston means movable along a substantial portion of said elongated flow channel responsive to the pressurized fluid, said piston means adapted to engage the stop means and close said open outlet end to create acoustic energy.

2. The source defined in claim 1 wherein the piston stop means has a spring rate and the mass of said piston means and the spring rate of said stop means are constructed so that the resulting springmass system has natural frequency generally equal to the cyclic pressure frequency within the flow channel.

3. The source defined in claim 1 and further comprising:
    rigid diaphragm means connected at said outlet end of said flow channel for radiating acoustic energy, said rigid diaphragm means including a plate having a piston seat defining an outlet in the plate for the flow channel on which it is mounted.

4. The source defined in claim 1 wherein compression waves are generated along said flow channel in response to the closing of said piston means against said seating structure, the frequency of said compression waves being dependent upon the length of said flow channel.

5. A source of acoustic energy for marine seismic exploration comprising:
    supply means for providing fluid under pressure,
    an elongated flow channel connected to said supply means and extending to an outlet located,
    valve means operable for directing high energy fluid from said supply means along said flow channel,
    piston means for being moved by said high energy fluid along said flow channel, and
    diaphragm means at said outlet location for abruptly arresting the movement of said piston means to create acoustic energy which is transmitted to the water through said diaphragm means.

6. The source of claim 5 wherein the mass of said piston means and the spring rate of said seating structure are constructed so that the resulting spring-mass system has a natural frequency generally equal to the frequency of the acoustic energy.

7. The source defined in claim 5 wherein said supply means comprises a container pressurized with gas.

8. The source defined in claim 5 wherein the arresting of the movement of said piston means abruptly terminates the flow of high energy fluid along said flow channel to create compressional waves along said flow channel.

9. The source of claim 8 wherein said compressional waves oscillate along said flow channel at a frequency determined by the length of said flow channel.

10. The source of claim 5 wherein said flow channel comprises a circular pipe having an internal diameter closely fitting the outer diameter of said piston means.

11. The source of claim 5 wherein said diaphragm means includes an opening therein, said opening defining a seat which said piston means seats upon to close said opening for generation of compressional waves along said flow channel.

12. The source of claim 11 wherein said diaphragm means includes a flexible expansion joint to allow movement of said diaphragm in response to said compressional waves generated in said flow channel.

13. The source of claim 5 wherein said piston means has a circular cross section and includes a tapered end portion for extending through an opening in said diaphragm means.

14. The source of claim 13 wherein said piston means has a resilient impact member disposed therein.

15. A system for generating acoustic waves for marine exploration comprising:
    pump means for picking up water,
    a pressurized container connected to said pump means for storing water under pressure,
    an elongated pipe connected at one end to said pressurized container and extending downwardly into the water at the other end,
    valve means connected between said pressurized container and said elongated pipe, a piston member slidable within said elongated pipe, expandable diaphragm means connected at the submerged end of said elongated pipe and including seating means for engaging said piston member, and means for selectively operating said valve means to direct a high energy supply of water against said piston member when at the upper end of said elongated pipe, whereby said piston member is forced at high speed down said elongated pipe into abutment with said seating means to create acoustic waves.

16. The system of claim 15 wherein the mass of said piston means and the spring rate of said seating structure are constructed so that the resulting spring-mass system has a natural frequency generally equal to the frequency of the acoustic energy.

17. The system of claim 15 wherein said diaphragm means includes a contained pocket of air on the back side thereof to reduce the effective impedance thereof.

18. The system of claim 15 wherein said piston member has a circular cross section generally equal in diameter to the internal diameter of said pipe.

19. The system of claim 15 wherein said diaphragm includes an opening in the center thereof, said piston member adapted to seat against said seating means to close said opening during operation of the system.

20. The system of claim 15 wherein compressional waves are generated along said elongated pipe when said piston member closes against said seating means, the frequencies of said compressional waves being dependent upon the length of said pipe.

21. The system of claim 15 wherein said system is mounted upon a vessel and wherein said pump means picks up water during traverse of the vessel.

22. A method for creating acoustic energy comprising:

directing a fluid under pressure from a pressurized tank source against a movable piston located adjacent an inlet end of a flow channel having an inlet end and an open outlet end, driving said piston responsive to the pressurized fluid down the flow channel to its open outlet end, and abruptly terminating movement of the piston body at the open outlet end of the flow channel to close said open outlet end to create acoustic energy.

23. The method of claim 22 wherein the movement of the piston body is terminated by abutment with seating structure at the end of the flow channel.

24. The method of claim 22 wherein the termination of movement of said piston body causes compressional waves to be directed along the length of the flow channel.

25. The method of claim 24 wherein the frequencies of the compressional waves are dependent upon the length of the flow channel.

26. The method of claim 22 wherein said transmission medium comprises water.

* * * * *